J. R. HOLLEY.
PERCOLATOR.
APPLICATION FILED MAR. 24, 1910.

988,268.

Patented Mar. 28, 1911.

WITNESSES:
M. E. O'Neill
Ed. E. Claussen

INVENTOR.
J. R. Holley,
BY Chas. T. Schmelz
ATTORNEY.

THE NORRIS PETERS CO., WASHINGTON, D. C.

UNITED STATES PATENT OFFICE.

JULIAN R. HOLLEY, OF BRISTOL, CONNECTICUT, ASSIGNOR TO THE BRISTOL BRASS COMPANY, OF BRISTOL, CONNECTICUT, A CORPORATION OF CONNECTICUT.

PERCOLATOR.

988,268.  Specification of Letters Patent.  Patented Mar. 28, 1911.

Application filed March 24, 1910. Serial No. 551,302.

*To all whom it may concern:*

Be it known that I, JULIAN R. HOLLEY, a citizen of the United States, and resident of Bristol, in the county of Hartford and State of Connecticut, have invented certain new and useful Improvements in Percolators, of which the following is a full, clear, and exact specification.

This invention relates to improvements in percolators, and more particularly to the "spreader" upon which the liquid falls from the ejector-tube and whereby the liquid is distributed over the ground-coffee contained within a suitable vessel beneath the same, and it has for its object the improved construction of such spreader whereby the liquid is caused to fall in large drops at certain predetermined points of the spreader-plate, irrespective of the quantity of water contained within the spreader.

The invention has been clearly illustrated in the accompanying drawings in which similar characters denote similar parts, and in which—

Figure 1:
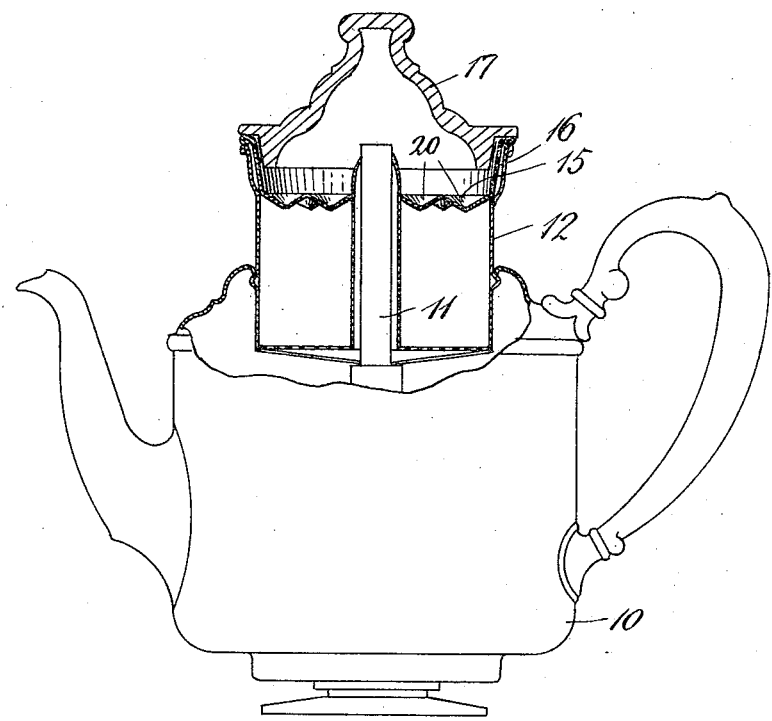
Figure 2:
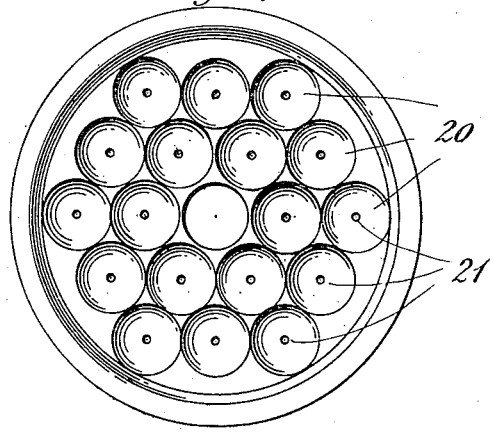

Figure 1 is a side view of a percolating coffee-pot partially shown in section to illustrate the organization of my improved spreader, with the other devices pertaining to the percolator. Fig. 2 is a top view on an enlarged scale of my improved spreader-plate, and Fig. 3 is a vertical cross section thereof.

In its general organization, the percolator comprises a pot 10, and a pump mechanism which includes the ejector-tube 11 which may be of any desired construction.

Resting upon a shoulder on the ejector-tube 11, is a perforated drip-cup 12 adapted to contain ground-coffee or similar material, and in the top of this cup is held the distributing-plate or spreader 15 having an upwardly-extending flange 16, the upper edge of which rests upon the upper edge of the drip-cup 12 and the open top of which may be closed by a cover 17 made of glass or any other suitable material.

Figure 3:
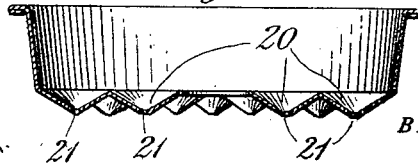

In the present instance, my improved spreader-plate is provided with a series of downwardly-projecting hollow cones 20, the upper edges of which intersect each other, and each of which is provided with a perforation 21 at the bottom apex thereof, and in order to facilitate the liquid entering said cones, the latter are comparatively shallow, as shown in Fig. 3. By virtue of this construction water will drip from the underside of these cones in large drops instead of a stream, irrespective of the quantity of water above the spreader-plate, and the discharge of water passing through the perforations of a pair of adjacent cones cannot unite on the underside of the spreader, so that in this manner the surface of the ground-coffee will be covered substantially uniformly throughout its entire extent.

I claim:—

1. In a percolator, the combination with a drip-cup and an ejector-tube, of a spreader disposed in the upper portion of said drip-cup and having a series of downwardly-projecting hollow cones perforated at their lower apexes to permit the passage of liquid therethrough.

2. In a percolator, the combination with a drip-cup, and an ejector-tube, of a spreader disposed in the upper portion of the drip-cup and provided with a series of downwardly-projecting hollow intersecting cones, each being provided at its lower apex with a perforation to permit the passage of liquid therethrough.

JULIAN R. HOLLEY.

Witnesses:
A. D. WILSON,
C. F. SCHMELZ,

Copies of this patent may be obtained for five cents each, by addressing the "Commissioner of Patents, Washington, D. C."